(12) United States Patent
Spizzamiglio et al.

(10) Patent No.: US 9,958,258 B2
(45) Date of Patent: May 1, 2018

(54) PORTABLE DEVICE FOR THE CONTACTLESS MEASUREMENT OF OBJECTS

(71) Applicant: AEROEL S.R.L., Pradamano (IT)

(72) Inventors: Antonio Spizzamiglio, Udine (IT); Paolo Micossi, Udine (IT); Luciano Bressan, Gorizia (IT)

(73) Assignee: AEROEL S.R.L., Pradamano (IT)

( * ) Notice: Subject to any disclaimer, the term of this patent is extended or adjusted under 35 U.S.C. 154(b) by 0 days. days.

(21) Appl. No.: 15/127,273

(22) PCT Filed: Mar. 19, 2015

(86) PCT No.: PCT/IB2015/052028
§ 371 (c)(1),
(2) Date: Sep. 19, 2016

(87) PCT Pub. No.: WO2015/140755
PCT Pub. Date: Sep. 24, 2015

(65) Prior Publication Data
US 2017/0108331 A1     Apr. 20, 2017

(30) Foreign Application Priority Data

Mar. 19, 2014   (IT) .............................. GO2014A0003
Dec. 29, 2014   (IT) .............................. UD2014A0198

(51) Int. Cl.
G01B 11/06    (2006.01)
G01B 11/08    (2006.01)
G01B 11/24    (2006.01)

(52) U.S. Cl.
CPC .......... *G01B 11/08* (2013.01); *G01B 11/2433* (2013.01)

(58) Field of Classification Search
CPC .... G01B 11/105; G01B 11/08; G01B 11/2433
See application file for complete search history.

(56) References Cited

U.S. PATENT DOCUMENTS

| 5,615,014 A | 3/1997 | Okuda |
| 2002/0041381 A1 | 4/2002 | Akishiba |

(Continued)

FOREIGN PATENT DOCUMENTS

| DE | 3824820 | 1/1990 |
| DE | 4308082 | 9/1994 |

(Continued)

OTHER PUBLICATIONS

International Search Report and Written Opinion, issued in the corresponding International Application No. PCT/IB2015/052028, dated Jun. 23, 2015, 11 pages.

*Primary Examiner* — Kara E Geisel
*Assistant Examiner* — Maurice Smith
(74) *Attorney, Agent, or Firm* — Hamre, Schumann, Mueller & Larson, P.C.

(57) ABSTRACT

Portable device for contactless measurement of a size, such as the diameter, of small and medium sized objects, such as wires, bars or tubes, even in movement, which comprises a light beam generator (1), two light beam deflector elements (2, 4) located opposite each other, a measuring region (3), an enlarging lens (5), a light beam splitting device (6). The light beam is split into two parts to form two separate images of the object (14) to be measured, being perceived by two linear image sensors (7.1, 7.2) and processed by two electronic circuits (8.1 and 8.2) and by an electronic processing component (9).

15 Claims, 5 Drawing Sheets

(56) References Cited

U.S. PATENT DOCUMENTS

2006/0017940 A1* 1/2006 Takayama .............. G01B 11/08
356/640
2010/0271638 A1* 10/2010 Torii ...................... G01B 11/08
356/625

FOREIGN PATENT DOCUMENTS

EP 0924493 6/1999
GB 2166236 4/1986

* cited by examiner

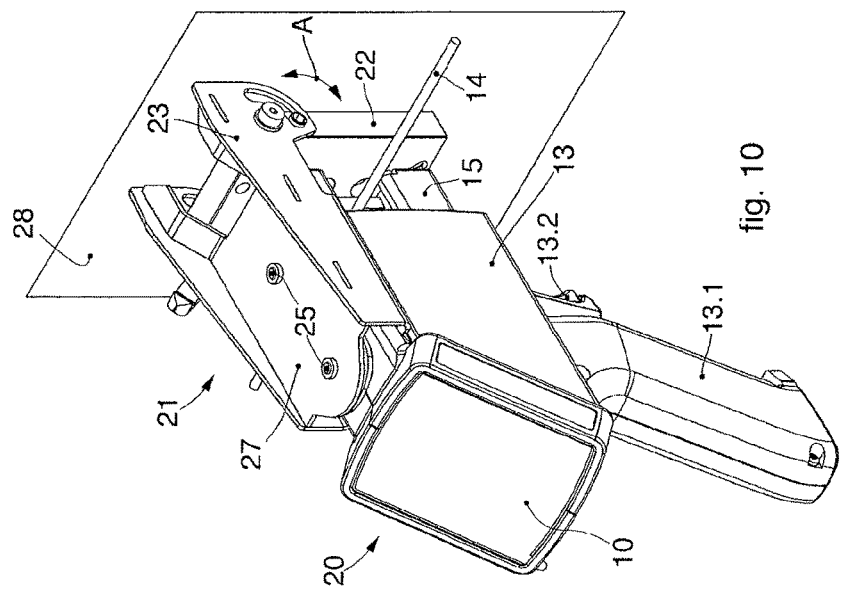
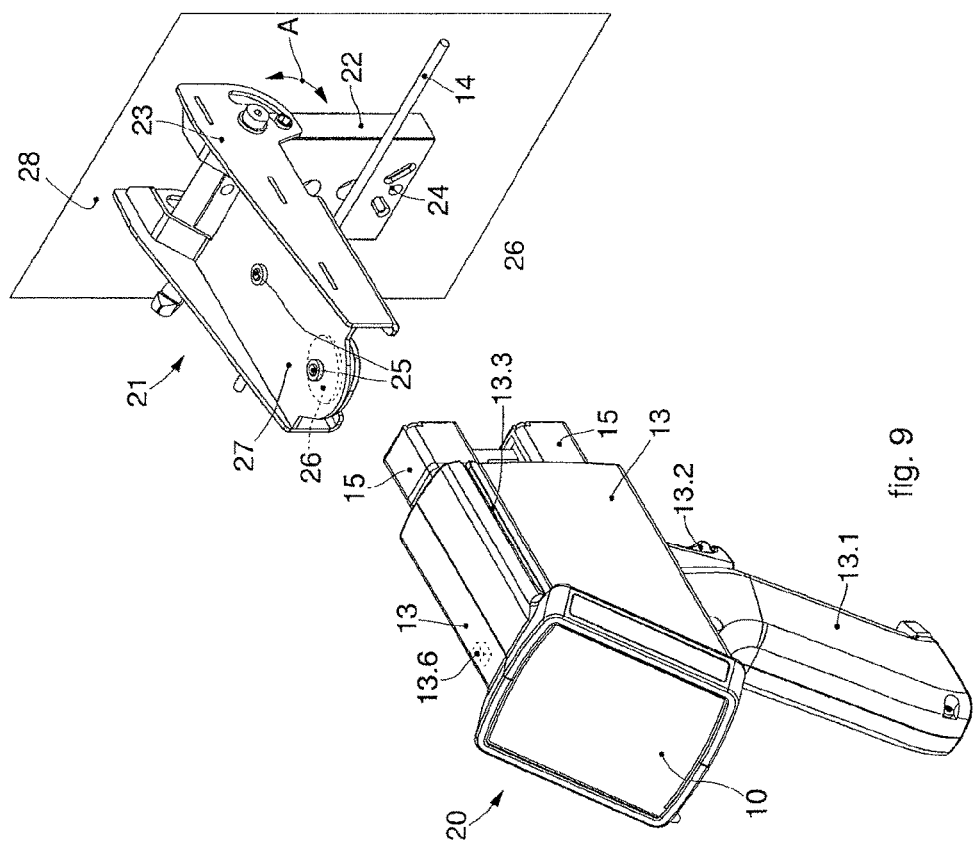

PORTABLE DEVICE FOR THE CONTACTLESS MEASUREMENT OF OBJECTS

FIELD OF THE INVENTION

The present invention concerns a portable device, also called optical micrometer, used manually for the contactless measurement of sizes, for example the diameter, of elongated objects of small and medium size, such as wires, bars or tubes, even in movement.

The invention also concerns a method for the contactless measurement of a size of elongated objects of small or medium size that uses said portable optical micrometer.

BACKGROUND OF THE INVENTION

During the steps of extrusion, drawing or enameling of wires or cylindrical bars, made of any material, it is often necessary to verify that their diameter is compatible with the desired measurements. For this function, laser or LED (Light-Emitting Diode) light apparatuses are known: these can be scanning types (laser scanner, for example) or can use linear sensors (for example CCD—Charge-Coupled Device or CMOS—Complementary Metal-Oxide Semiconductor) to detect and measure the shadow of the product to be measured, which can be correlated to the size to be measured.

Normally these apparatuses do not need an exact positioning of the object in the measurement field, but it is necessary that the axis of the product to be measured is located substantially at 90° with respect to the scanning plane (laser scanner) or to the axis of the linear sensor; each shift from the perpendicular causes measurement errors that are directly proportional to the diameter and inversely proportional to the cosine of the angle between the axis of the product and the perpendicular to the measuring plane.

Moreover, all these apparatuses must effect the average between numerous individual measurements (scanning) so as to stabilize the measurement and to obtain repeatability values in the order of a micron or less.

In such apparatuses, the wire, or in general the product to be measured, normally in movement, enters into the reading field of the apparatus that supplies the measurement required. These apparatuses are all normally attached to the machine that works the wire or the bar.

Fixed micrometers are able to carry out quality controls while the wire or other cylindrical product advances at considerable speeds, in the order of 30 m/sec. The reading takes place correctly despite the high speed, which in itself does not cause measuring errors, and in many cases irrespective of the vibration of the product. In fact, provided that on average the axis of the product is maintained at 90° with respect to the measuring plane, such vibration induces errors that can in many cases be minimized by the simple mean (laser scanner) or by strobe light techniques (micrometers with LED+CCD, or CMOS).

However, sometimes, it is necessary to carry out this type of quality control at different points of the line, or on different lines. This entails using various fixed micrometers and a consequent increase in production and management costs of the various measuring devices.

Wireless and portable apparatuses are also known, which use laser or LED light, with similar principles to those used in fixed micrometers, but simply miniaturized and battery powered. However, these operate correctly only on condition that the relative position and the orientation between the object to be measured and the measuring device or micrometer, are certain, which cannot be the case when the micrometer is used manually. To overcome this drawback, guide devices are used for the wire, which require contact with the product to be measured; such micrometers cannot therefore be used to measure products in movement or products for which physical contact may alter or damage the product itself.

A mobile micrometer is known for example, with the commercial name of Lear Gun, in which the object to be measured slides on a plastic prism during the reading step. A wireless micrometer is also known, in which the sample to be measured translates on small guide wheels of the wire.

Known portable micrometers therefore require, for a correct alignment of the sample to be measured, physical contact of the wire, or the product in general, with the aforesaid guides. In practice these requirements make it impossible to use these micrometers to measure the product in movement during extrusion, drawing and/or enameling.

It is also known, in the state of the art, to use sensors of the CCD or CMOS type with linear detection or a two-dimensional matrix for reading the image. CCD or CMOS type linear sensors only make detections along a line, by means of a successive series of detections, up to several thousands a second, in order to obtain a single value after the mean, with a high processing speed. CCD or CMOS two-dimensional sensors, or area sensors, require much higher processing and calculation capacities than a linear sensor, since they are equipped with a much higher number of sensitive elements (pixels) than a simple line of n elements (typically $n^2$), with the obvious result of very long processing times.

US 2002/0041381 A1 describes an apparatus for contactless optical measurement of a profile, in which the optical measuring unit develops in an axial direction from the point of generation of the light source as far as a beam splitter without being subjected to any change in direction. The light is generated by a LED source which passes through a light collimation lens in a parallel ray. The parallel ray irradiates the object to be measured, which generates a portion of shadow beyond the object of the measurement. The parallel ray arriving from the object is collected by a reception lens, and is incident on a linear image sensor through the beam splitter and a first diaphragm. Furthermore, the light separated by the beam splitter is incident on the surface image sensor through a second diaphragm.

The diameter is measured by processing the data of the linear sensor, while the purpose of the area sensor is to supply the user with an image (silhouette) of the object near the measuring region, on which image a marker line is superimposed and displayed, corresponding to the real position of the linear sensor; in this way the user uses the marker line as a sight line, to position the instrument exactly in correspondence with the position along the piece where the measurement is to be made. This device is very useful (if not necessary) precisely in LED light micrometers and CCD or CMOS linear sensors, because in these instruments the beam of LED light that "illuminates" the product is very extensive, also in a direction orthogonal to the measuring plane, and this makes it impossible to know, with a certain accuracy, the actual measuring position on the piece. It should be noted that, on the contrary, laser scanning apparatuses project a thin "blade of light" onto the piece to be measured, generally red light, which identifies the measuring position in a very evident way (in reality, it is the mobile scanning beam which, given the persistence of the image in the human eye, is seen as a "blade" of light).

The combination of the two CCD image sensors of the linear type and with a two-dimensional matrix entails long calculation times due to the quantity of data that the image processing electronic component acquires from the image sensors, in particular from the two-dimensional matrix CCD image sensor. Furthermore, since this form of embodiment of optical measurement develops in an axial direction, the measuring apparatus is necessarily very bulky.

Document DE 43 08 082 A1 provides to emit a beam of light generated by an infrared diode. After passing through a lens, the beam is deflected by a first deflector element so that it can hit the object inside the measurement field. The measurement field is delimited on one side by the first deflector element and on the other side by a second deflector element positioned specular with respect to the first deflector element. The beam of light thus composed of light and shadow reaches a second lens and a single two-dimensional matrix CCD image sensor. In the solution described in this document, the measuring apparatus, equipped with a single image sensor, is usable on condition that there is contact between the wire or bar and guide systems, to prevent misalignments between the object to be measured and the beam of light. Moreover, in this case too, using a two-dimensional matrix CCD image sensor entails higher processing and calculation times than a linear CCD image sensor. Consequently, if on the one hand this solution allows to obtain a compact and manageable instrument for measurements in the field, thanks to a configuration that is not developed on a single axis as in US '381, on the other hand it entails longer image processing times and obliges the wire or product to be measured to be in contact with at least one guide element.

Purpose of the present invention is to obtain a portable micrometer for really contactless measurement of elongated elements, also in movement, able to solve the problems described above; in particular, the purpose is to obtain a portable micrometer equipped with a compensation system such as to make the measurement virtually independent of the angle of the product, with an extremely rapid reaction time such as to allow manual use of the instrument, tolerating the inevitable misalignments and random oscillations deriving from such use.

The Applicant has devised, tested and embodied the present invention to obtain these and other purposes described hereafter.

SUMMARY OF THE INVENTION

The present invention is set forth and characterized in the independent claims, while the dependent claims describe other characteristics of the invention or variants to the main inventive idea.

In accordance with the present invention, the measuring device comprises, as essential elements, a light beam generator, at least one light beam deflector element, a measuring region, a lens, a light beam splitting device, two linear image sensors, two electronic image acquisition circuits and an electronic image processing component.

In a preferred form of embodiment, the micrometer also comprises a user interface and possibly an electric accumulator.

In a preferred form of embodiment, the light beam generator, the at least one light beam deflector element, the lens, the light beam splitting device, the linear image sensors, the electronic image acquisition circuits, the electronic image processing component and the possible electric accumulator are mounted on a support body and are protected externally by a casing.

In a preferred form of embodiment, the user interface can be attached to the casing.

In an advantageous form of embodiment, the support body is equipped with a handle to facilitate use while, according to another advantageous form of embodiment, the support body is also equipped with elements able to protect the apparatus, in particular its optical elements, and the user, in particular the user's hand.

In a preferred form of embodiment, the light beam generator is formed by a LED, by an aspheric lens and by a chamber that contains the aspheric lens, or both the aspheric lens and the LED.

According to one form of embodiment of the present invention, the light beam splitting device is located in proximity to one end of the lens. It is suitable to split the light beam into two parts and preferably but not necessarily consists of a cube beam splitter with a 50% semi-reflecting diagonal.

Each linear image sensor is preferably positioned in substantial correspondence to the plane struck by one of the parts of the light beam split by the light beam splitter.

Each linear image sensor is also configured to detect the quantity of light on different points along its line and to convert it into electric quantities.

Each linear image sensor is preferably provided with sensitive elements (pixels) which are disposed linearly.

An integrated electronic circuit for the acquisition of images is connected to each linear image sensor. The electronic image acquisition circuit is configured to detect the electric charge accumulated in the different points of the sensor and to convert it into a sequence of numerical values.

According to the present invention, the measuring region in which the moving product to be measured is located is defined by three axes Z, X, Y which are orthogonal with respect to each other, intersecting at a point O, called measuring center.

Axis Z is parallel to the light beam that passes through the measuring region. Axis X, orthogonal to axis Z, indicates the preferential alignment of axis W of the cylindrical object to be measured. Axis Y, orthogonal to axes X and Z, indicates the direction in which the diameter of the object is measured. The intersection point O of the three axes X, Y and Z is located substantially at the geometric center of the measuring region.

The object to be measured must be oriented so that its longitudinal axis W is directed approximately along axis X, in the direction perpendicular both to the direction of the light beam (axis Z) and to the direction of measurement of its diameter (axis Y).

This preferential direction of the object to be measured with respect to the apparatus can be advantageously highlighted by means of visible visual signals by the operator, such as sight lines and colored areas on the external casing of the apparatus itself.

The quality of the alignment of the object to be measured, once it has been inserted into the measuring region, can be confirmed by a numerical value or by a graphic indicator visible on the user interface display, possibly assisted by an acoustic signal.

The portable micrometer in question does not require physical contact of the wire with elements of the micrometer itself or with guides, to obtain sufficient alignment for the correct measurement of the object to be measured. It slides inside the measuring region without contact. It is therefore possible to use the apparatus in question to measure a wire or a similar product in movement during extrusion, drawing and/or enameling.

Thanks to the presence of the two linear sensors, each of which is positioned in substantial correspondence to the plane struck by one of the parts of the light beam, and each of which is configured to detect the quantity of light on the different points along its line, the micrometer in question allows to compensate, through suitable processing of the signal, the variations in alignment of the object to be measured with respect to the ideal coaxial position with the axis; it does not therefore necessarily require an accurate positioning to make the measurement.

Being wireless, and therefore portable, the portable micrometer can be used at different points of the line or on different lines.

In an advantageous form of embodiment, the portable micrometer comprises a support element that allows a fixed positioning thereof on the production line, both rapidly and easily.

In particular, the support element can be fixed in a known way on the machine for working the object to be measured, or in another fixed part, and can provide positioning and guide elements configured to cooperate with mating guide elements present on the support body of the micrometer, in order to position the measuring instrument in a fixed way, but at the same time to remove it and re-position it easily in another position with respect to the machine, or to use it in a mobile way.

This cooperation between guide and positioning elements ensures that, in the assembled position on the support element, the centering of the micrometer is guaranteed, both with respect to a horizontal measurement field and to a vertical measurement field.

Moreover, an RFID (Radio Frequency IDentification) tag can be integrated in the support element which, read by a suitable circuit installed in the instrument, allows to identify the measuring position (or the machine) and to make an association in the memory of the instrument between the measurement made and the position (or machine) where said measurement was made.

BRIEF DESCRIPTION OF THE DRAWINGS

These and other characteristics and advantages of the present invention will become apparent from the following description of one form of embodiment, preferred but not exclusive, of the measuring device according to the present invention, given as a non-restrictive example in the attached drawings, wherein:

FIG. 9 shows another variant of the measuring device according to the invention, in which a support element is provided, while FIG. 10 shows the variant in FIG. 9 with the measuring device coupled with its support element.

Figure 1:
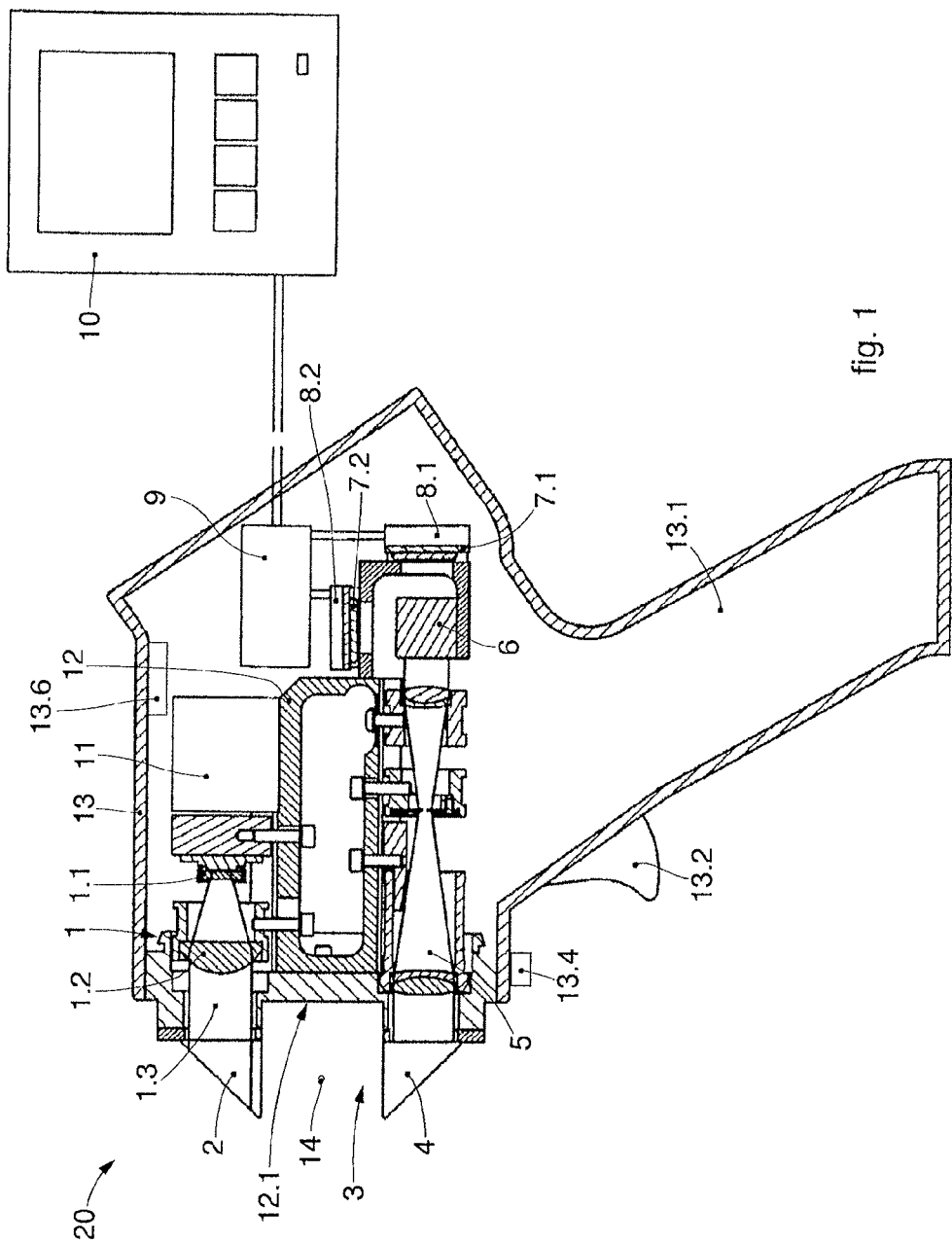
FIG. 1 shows a longitudinal section of the device according to the invention.
Figure 3:
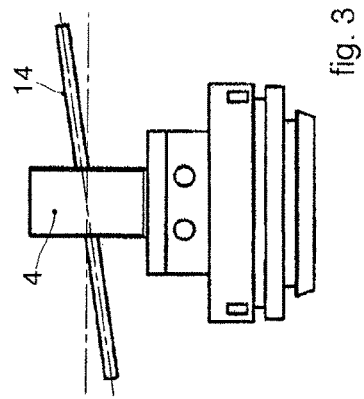
FIG. 3 shows an upper view of the measuring region.
Figure 4:
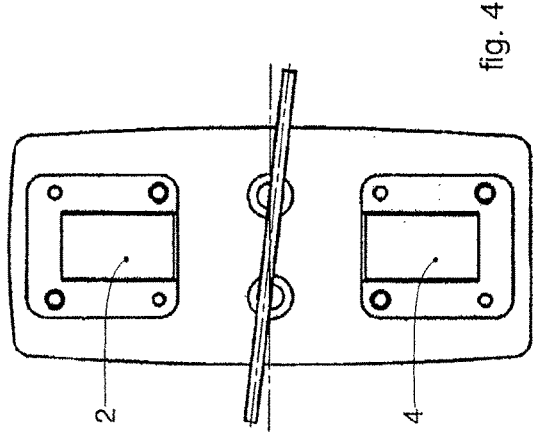
FIG. 4 shows a front view of the measuring region.
Figure 2:
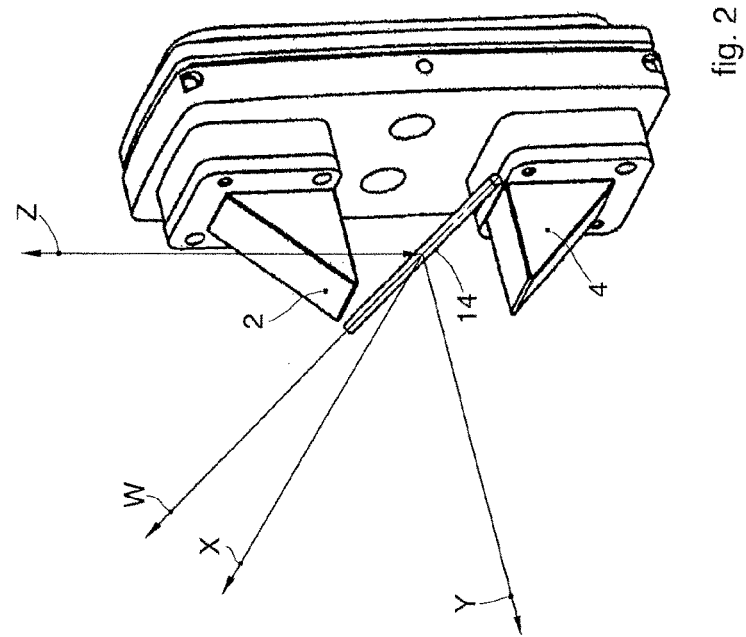
FIG. 2 shows an enlargement of the measuring region of the device in FIG. 1.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF ONE FORM OF EMBODIMENT

With reference to the attached drawings, the measuring device, or micrometer, according to the present invention is indicated in its entirety by the reference number 20.

With particular reference to FIG. 1, the measuring device 20 comprises a light beam generator 1, a first light beam deflector element 2 disposed frontally with respect to the light beam generator 1, a measuring region 3 disposed in the path of the deflected beam of the first deflector element 2, and a second light beam deflector element 4 disposed in an opposite position with respect to the first deflector element 2, to deflect the light beam in a direction contrary to the direction in which it is emitted by the generator 1.

The measuring device 20 also comprises, in the form of embodiment shown, a lens 5, a light beam splitting device 6, two linear image sensors 7.1, 7.2, two electronic image acquisition circuits 8.1, 8.2, and an electronic image processing component 9, a user interface 10 and an electric accumulator 11 to power the apparatus electrically and an antenna 13.6 to read an RFID tag 26, as explained in detail hereafter.

All the components cited above, except the user interface 10, are mounted on two sides of a support body 12 and are protected externally by a casing 13, which forms a handle 13.1 to hold and use the measuring device 20.

Figure 8:
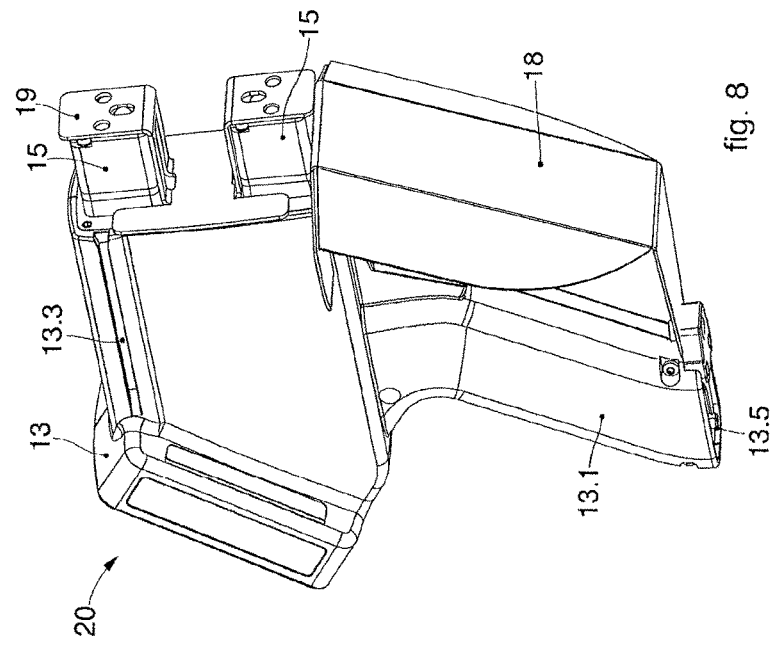
FIG. 8 shows the variant in FIG. 7 in its assembled condition.
Figure 7:
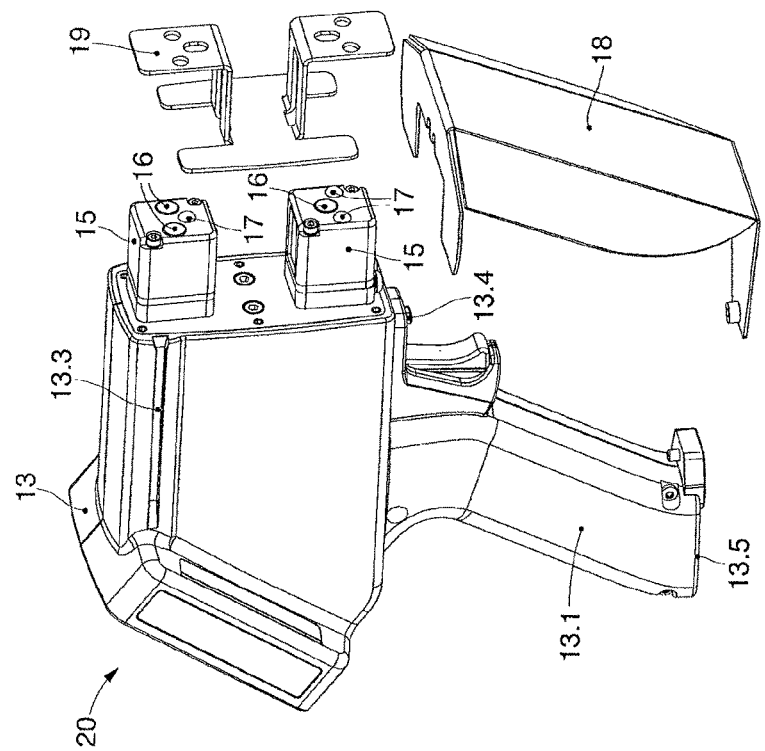
FIG. 7 shows a partly exploded view of a variant of the measuring device according to the invention separated from the devices that protect the optics and the user.

With reference to the form of embodiment in FIGS. 7 and 8, the two light beam deflector elements 2 and 4 are protected by a respective containing structure 15. Each containing structure 15, in this case, is equipped at the front with magnetic retention elements 16 and with centering elements 17 of the sphere type. The magnetic retention elements 16 and centering elements 17 allow the selective positioning of protection elements 19, shown disassembled in FIG. 7 and assembled in FIG. 8, to protect the light beam deflector elements 2 and 4.

Again with reference to FIGS. 7 and 8, it can be seen how one form of embodiment of the invention provides a protection element 18 which can be selectively assembled on the handle 13.1 to mainly protect the user's hand when measuring objects in movement at high speed and/or at high temperature.

In particular, the upper end of the protection element 18 can be removably anchored, for example by means of a screw-type attachment mean, to the containing structure 15 that protects the optical deflector 4, while the lower end of the protection element 18 can be anchored, by means of a screw-type attachment mean, to the attachment hole located on the end part of the handle 13.1.

Returning to FIG. 1, the light beam generator 1 is formed by a LED 1.1, an aspheric lens 1.2 and a chamber 1.3 that, in the case shown, contains the aspheric lens 1.2. The LED 1.1 is located at a first end of the chamber 1.3 and is collimated to the focus of the aspheric lens 1.2.

The first light beam deflector element 2 consists in this case of a 45° prism equipped with a mirror on the oblique face, and with a first side, vertical in the drawing, that closes the chamber 1.3.

The light beam generator 1 and the first light beam deflector element 2 are attached on one side of the support body 12.

The measuring region 3 is located at the front of the measuring device 20 and consists of an empty space delimited by the front wall 12.1 of the support body 12, by the second side, horizontal in the drawing, of the first light beam deflector element 2 and by a first side, also horizontal in the drawing, of the second light beam deflector element 4. The wall and sides are orthogonal with respect to each other and delimit three sides of a hollow parallelepiped.

The second light beam deflector element 4 and the remaining devices are attached on the other side of the support body 12.

The second light beam deflector element 4 is a 45° prism equipped with a mirror on the oblique face.

The second side of the second light beam deflector element 4 in this case occupies a first end of the lens 5. The lens 5 can be, for example, the telecentric type.

In proximity to the second end of the lens 5 the light beam splitter device 6 is located, consisting, for example, of a cube beam splitter with a 50% semi-reflecting diagonal.

Each of the two linear image sensors 7.1, 7.2 is positioned in correspondence to the plane struck by a part of the split light beam. The two linear image sensors 7.1, 7.2 used in the present example, although not restrictive, are two CCD or CMOS linear sensors.

A first electronic image acquisition circuit 8.1 is connected to the first linear image sensor 7.1 and a second electronic image acquisition circuit 8.2 is connected to the second linear image sensor 7.2.

The electronic image processing component 9 consists of a microprocessor unit with a memory and suitable entrance/exit ports connected to the electronic image acquisition circuits 8.1, 8.2 and with the user interface 10.

In an advantageous form of embodiment, the user interface 10 comprises an LCD graphic screen, a series of buttons, and an acoustic alarm; there can advantageously be a LED light to indicate the condition of the battery. The handle 13.1 also has a button 13.2, a safety button 13.4 and a USB port, as an example of a peripheral connection device 13.5, as well as the antenna 13.6 for reading an RFID tag 26, shown hereafter.

During use, in order to measure an elongated object 14 to be measured, the light generated by the LED 1.1, after having passed through the aspheric lens 1.2, has the form of an extended and collimated light beam that reaches the second end of the chamber 1.3. The light beam has a roughly uniform distribution of radiant energy, both spatially on an area perpendicular to the axis of the beam and also angularly for directions comprised within a certain angle from the axis.

The first light beam deflector element 2 conditions the light beam emitted by the light beam generator 1 so that it passes through the measuring region 3 in a direction substantially orthogonal with respect to the direction prescribed for the axis W of the object 14 to be measured and that completely illuminates the whole extension of the measuring region 3 so that the measuring can be done in all the permitted positions of the object 14.

In the measuring region 3 three axes Z, X, Y are defined which are orthogonal with respect to each other, intersecting said measuring center at a point O. Axis Z is parallel to the direction imposed on the light beam by the first light beam deflector element 2. Axis X, orthogonal to axis Z, indicates the preferential alignment of the axis of the object 14 to be measured. Axis Y, orthogonal to X and Z, indicates the direction in which the diameter of the object 14 is measured. The intersection point O of the three axes X, Y, Z is located at the geometric center of the measuring region 3.

The exit side of the first light beam deflector element 2 and the entrance side of the second light beam deflector element 4 are parallel to each other, perpendicular to axis Z and parallel to axes X, Y. The wall 12.1 of the support body 12 that delimits the measuring region 3 is parallel to axis Z and axis X.

The object 14 to be measured is introduced into the measuring region 3 without either position or orientation being known.

The disposition of the first light beam deflector element 2 is such that the object 14 is lit from behind with respect to the lens 5. The image which forms on the side of the second light beam deflector element 4 that delimits the measuring region 3 has the characteristic of an outline or silhouette, dark and without other details other than an outline on a clear background.

The second light beam deflector element 4 again directs the light beam at 90° so that, after passing through the measuring region 3, the light beam is aligned and centered on the optical axis of the lens 5. The lens 5 creates a real image of the object 14 to be measured, whose shape corresponds to the orthogonal projection of the object 14 on the plane XY as defined above, enlarged by a constant factor Q characteristic of the particular lens 5 used.

The size of the image is independent of translations of the object 14 to be measured along the axis Z of the measuring region. On the image plane the two axes $X^1$ and $Y^1$ are naturally defined, corresponding to the images of the two axes X and Y previously defined.

The image formed on the image plane of the lens 5 is a dark band with parallel edges that form an angle $\chi$ with respect to the axis $X^1$ and a width equal to Q times the diameter D of the object 14 to be measured.

The light beam, after having passed through the lens 5, is split into two parts by the light beam splitter 6, each of which forms on each linear image sensor 7.1, 7.2 an image of the object 14 to be measured that is geometrically equal to the one that would have been formed directly by the lens 5 but in a separate spatial region from those of each other image. In this way the two linear image sensors 7.1, 7.2, located in correspondence to the two parts of the separate images that correspond either completely or partly to the same region of the original image, can be simultaneously activated without the two linear image sensors 7.1, 7.2 interfering mechanically with each other.

The position of each linear image sensor $7._k$ (where $7._k$ indicates the first sensor 7.1 or the second sensor 7.2) with regard to its own image plane is individually identified by three coordinates $x_{0k}$, $y_{0k}$ and $\alpha_k$ that describe the position of the central point of the linear image sensor $7._k$ in a system of axes $X_k$, $Y_k$ and the angle formed by axis $s_k$ of the linear image sensor $7._k$ with axis $Y_k$ of the image plane.

Each linear image sensor 7.1, 7.2 supplies the distribution of light energy incident on the image along a rectilinear segment of the image itself.

The linear image sensors 7.1, 7.2 located on the planes of the two images produced by the light beam splitter device 6 are positioned so as to affect distinct segments. The segment of image corresponding to each sensor $7._k$ can then be identified by the coordinates $x_{0k}$, $y_{0k}$ that the central point of the sensor occupies in the image plane and by the angle $\alpha_k$ formed by the axis $s_k$ of each linear image sensor $7._k$ with the axis $Y_k$ (image of axis Y) of the associated image plane.

In this preferential form of embodiment, the central point of the linear image sensors 7.1, 7.2 is given by the coordinates $$x_{01}, y_{01} = 0$$

$$x_{02}, y_{02} = 0$$

and for each linear image sensor 7.1, 7.2 the angle $\alpha$ is given by $$\alpha_1 = +7.5°, \alpha_2 = -7.5°$$

The individual points of the segment identified by the linear image sensors 7.1, 7.2 are described by a coordinate $s_k$ directed along the segment and originating in the point where the segment intersects axis $Y^1$.

Figure 5:
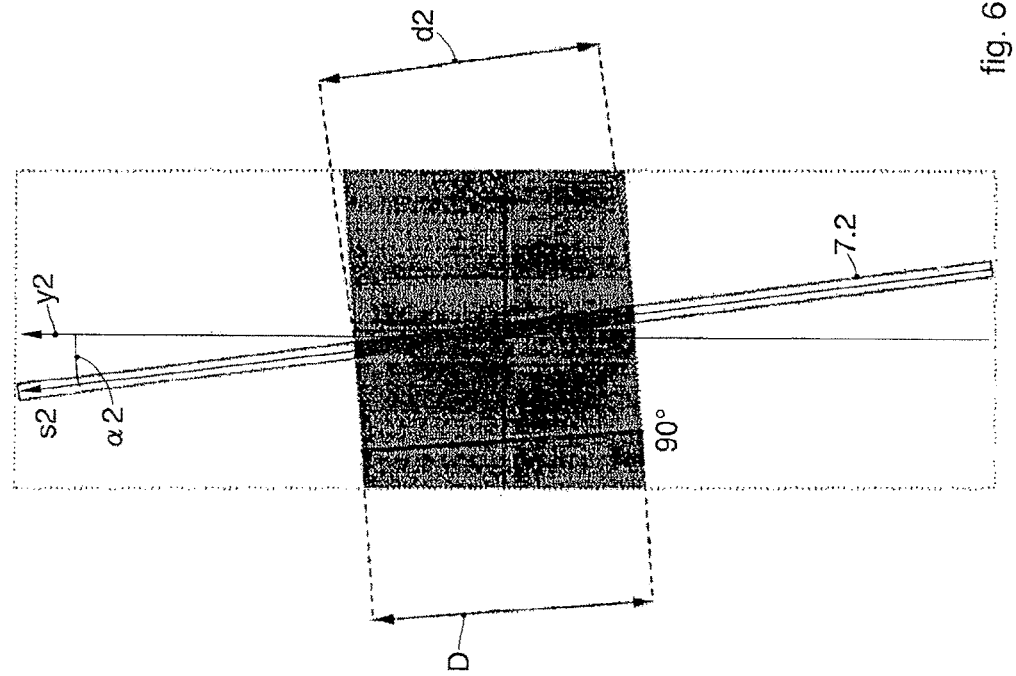
FIG. 5 shows one of the two images of the object to be measured formed on a linear image sensor and the geometric relation between the quantity $d_1$ detected by it and the diameter D to be measured.
Figure 6:
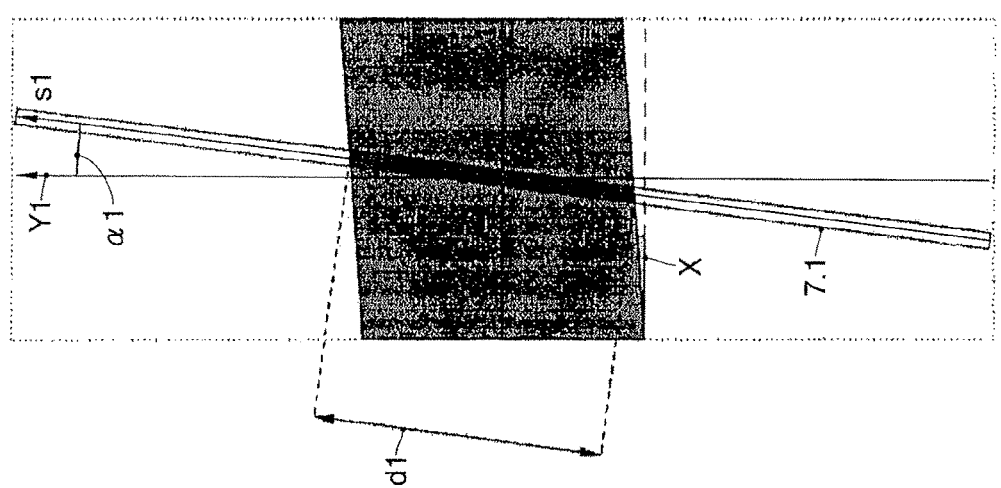
FIG. 6 shows the second of the two images of the object to be measured formed on a second linear image sensor and the geometric relation between the quantity $d_2$ detected by it and the diameter D to be measured.

When the object 14 to be measured is positioned correctly in the measuring region 3, each sequence of values produced by each sensor and representing the distribution of light energy incident on it is formed by a region of high values of the incident energy followed by a region of low values, corresponding to the passage of the dark band formed on the image by the object 14 and followed by another region of high values. The region of low values is determined for each sensor $7._k$ by two quantities $d_k$ and $c_k$ that respectively represent the length of the segment on the sensor $7._k$ obscured by the image of the object 14 to be measured (the black strip in FIGS. 5 and 6) and the position on the axis $s_k$ of the center of the same segment.

Each electronic image acquisition circuit 8.1, 8.2 obtains information relating to the distribution of light energy from each of the two linear image sensors 7.1, 7.2 and transmits the digitalized values of the measurements to the electronic image processing component 9. The electronic image processing component 9 provides to control and receive the two sequences of numerical values from the two electronic acquisition circuits 8.1, 8.2 and determines the values $d_1$ and $d_2$ corresponding to the lengths of the obscured regions on the two sensors and the values $c_1$ and $c_2$ corresponding to the central positions of the regions obscured on axes $s_1$ and $s_2$.

The value of the angle $\chi$ can then be calculated by the formula:

$$tg\left(\chi - \frac{\alpha_1 + \alpha_2}{2}\right) = \frac{1}{tg\left(\frac{\alpha_1 + \alpha_2}{2}\right)} \cdot \frac{d_1 - d_2}{d_1 + d_2}$$

The calculation program performed by the electronic image processing component 9 comprises an algorithm that uses this formula to determine the value of $\chi$. When this is known, the calculation program can be continued to determine the diameter D of the object 14 in the form:

$$D = \frac{1}{2Q}(d_1 \cos(\alpha_1 + \chi) + d_2 \cos(\alpha_2 + \chi))$$

In another preferential form of embodiment the two linear image sensors 7.1, 7.2 are positioned so that $\alpha_1$ is equal to $\alpha_2$. In this case the value of the angle $\chi$ can be calculated by the formula:

$$tg\chi = \frac{y_{02} - y_{01} + (c_2 - c_1)\cos\alpha_1}{x_{02} - x_{01} + (c_2 - c_1)sen\alpha_1}$$

Once $\chi$ is known, the calculation program can be continued to determine again the diameter D of the object 14 in the form:

$$D = \frac{1}{2Q}(d_1 \cos(\alpha_1 + \chi) + d_2 \cos(\alpha_2 + \chi))$$

When each acquisition and calculation procedure is completed, the electronic processing component 9 sends to the user interface 10 the numerical value of the measurement of the diameter D of the object 14 indicating the unit of measurement selected or a possible error condition that are displayed on the LCD graphic screen.

The buttons of the user interface 10 command at least the activation/de-activation of the apparatus, the start of the acquisition and calculation procedure, the activation/de-activation of the continuous display of the orientation of the object 14 to be measured, the change of the unit of measurement and the illumination function of the LCD screen. A button 13.2 to activate/de-activate the apparatus is positioned on the handle 13.1.

If activated by a button, an image is displayed on the LCD screen of the user interface 10. The image describes graphically the deflection of the axis of the object 14 with respect to the ideal orientation, showing two segments that intersect with an angle proportionate to the deflection. This allows to verify the quality of the alignment of the object 14 with respect to the axis X in the measuring region 3, and to make the necessary movement of the hand to correctly obtain the measuring operation. The user is assisted in this operation by acoustic signals and by sight lines or colored areas present on the casing 13. Furthermore, as each acquisition and calculation procedure is completed, the numerical value of the measurement D is displayed, indicating the unit of measurement selected or a possible error condition. The user interface 10 also allows to view interesting statistics of repeated measurements and data on the devices of the apparatus in order to configure it in the best possible way. In one form of embodiment of the present invention, shown in FIGS. 9 and 10, a support element 21 is provided, which allows to position the measuring device 20 fixedly along the production line, for example attaching it to a machine where the objected 14 subjected to measuring is worked.

The support element 21 comprises a fixed part 22 and a mobile part 23. The fixed part 22 comprises seatings 24 to attach it to a wall of the machine or other fixed part, for example a wall 28.

The mobile part 23 can rotate in direction A from a vertical position, substantially parallel to the fixed part 22 when not in use, to a substantially horizontal position, shown in FIGS. 9 and 10, where the measuring device 20 can be coupled with the support element 21.

The mobile part 23 comprises a flat upper wall 27; the support element 21 comprises, at the lower part and at the sides of the flat wall 27, two edges parallel to the flat wall 27 which cooperate with mating grooves 13.3 present in the upper part of the casing, promoting the insertion through sliding of the measuring device 20 on the support element 21, until it is clamped. Using the support element 21 allows to position the measuring device 20 easily and quickly, guaranteeing the plan positioning and centering thereof with respect to the object 14 to be measured.

Furthermore, using a plurality of support elements 21 distributed on several lines or at several predetermined points of the same line allows to periodically monitor several production lines using a single measuring device 20, possibly after simultaneous identification of said line or specific segment of line using an identification device, such as a tag, bar code or other similar element.

In one form of embodiment, the identification device can be an RFID tag 26 attached on the lower side of the flat wall 27 by attachment elements 25, for example screws or rivets or suchlike, possibly using support elements, not shown. In particular, when the apparatus is attached to the support element 21, the RFID tag 26 identifies the production line in correspondence with which it is detecting the data, through the antenna 13.6 mentioned above, and also its position along the line, any possible work under way and other possible information that can be useful during measuring.

Modifications and variants may be made to the present invention, all of which shall come within the field of protection defined by the attached claims.

The invention claimed is:

1. A portable measuring device for contactless measurement of a diameter of an elongated object, comprising:
 a light beam generator that generates a light beam and emits the light beam in a first direction;
 a first light beam deflector element disposed frontally with respect to the light beam generator, the first light beam deflector receiving the light beam generated by the light beam generator and deflecting the light beam along a beam path;
 a measuring region disposed along the beam path, the first light beam deflector element being disposed at one side of the measuring region;
 a second light beam deflector element disposed at a second side of the measuring region opposite the first deflector element, the second light beam deflector receiving the light beam deflected by the first light beam deflector element, and the second light beam deflector element deflecting the received light beam in a second direction opposite the first direction;
 a lens configured to receive the deflected light beam from the second light beam deflector element and create a light beam with a real image of the elongated object;
 a light beam splitting device located to receive the light beam of the real image from the lens and configured to split the light beam of the real image into two parts, each part forming a respective image of the elongated object, and each part being directed along an image path;
 a first linear image sensor disposed along one of the image paths and a second linear image sensor disposed along the other one of the image paths, the first linear image sensor provided with sensitive elements disposed linearly along a first plane and the second linear image sensor provided with sensitive elements disposed linearly along a second plane different from the first plane, the first and second planes of the first and second linear image sensors define respective axes different from each other, the first and second linear image sensors measure quantity of light along the axes, each of the first and second linear image sensors being configured to detect quantity of light impinging thereon and to convert detected light into electrical quantities;
 a first electronic image acquisition circuit connected to the first linear image sensor and a second electronic image acquisition circuit connected to the second linear image sensor; the first and second electronic image acquisition circuits each being configured to detect the electrical quantities of the respective first and second linear image sensors and to convert the detected electrical quantities into a sequence of numerical values; and
 an electronic image processing component connected to the first and second electronic image acquisition circuits and receiving the numerical values therefrom, the electronic image processing component is configured to use the numerical values to determine the diameter of the elongated object.

2. The portable measuring device as in claim 1, further comprising a support body that supports the light beam generator, and a casing that encloses the support body; the casing defining at least a handle part for the portable measuring device.

3. The portable measuring device as in claim 2, further comprising a support element that includes guide edges; and the casing has a surface with guide grooves that can couple with the guide edges to fixedly support the portable measuring device to the support element.

4. The portable measuring device as in claim 3, wherein the support element comprises a fixed part able to be anchored to a part of a wall or a part of a machine, and a mobile part having an inactive position substantially parallel to the fixed part and an operating position substantially orthogonal to the fixed part; and the mobile part includes the guide edges.

5. The portable measuring device as in claim 4, wherein the mobile part has a flat wall provided with attachment elements for clamping an RIFD tag.

6. The portable measuring device as in claim 2, further comprising a user interface coupled with the casing and in communication with the electronic image processing component, the user interface includes a display and a plurality of input buttons.

7. The portable measuring device as in claim 6, wherein the user interface is configured to display visible visual signals highlighting a preferential direction of the elongated object into the measuring region.

8. The portable measuring device as in claim 2, further comprising at least one hand protection element that is configured to be removably coupled to the casing.

9. The portable measuring device as in claim 1, wherein the light beam generator comprises an LED, an aspheric lens and a chamber which contains the aspheric lens, wherein the LED is located at a first end of the chamber and is collimated to a focus of the aspheric lens.

10. The portable measuring device as in claim 1, wherein the first and second light beam deflector elements each comprises a prism with an oblique face and a mirror disposed on the oblique face.

11. The portable measuring device as in claim 1, wherein the measuring region includes a geometric center that is located at an intersection point of a three axes system "X", "Y" and "Z" orthogonal with respect to each other, wherein:
 the "Z" axis is parallel to a direction of propagation of the light beam through the measuring region;
 the "X" axis is orthogonal to the "Z" axis and is parallel to an axis "W" of the elongated object;
 the "Y" axis is orthogonal to the "X" axis and to the "Z" axis.

12. The portable measuring device as in claim 11, wherein the lens is a telecentric type.

13. The portable measuring device as in claim 1, wherein the light beam splitting device comprises a cube beam splitter with a 50% semi-reflecting diagonal.

14. The portable measuring device as in claim 1, further comprising at least one protection element for the first and second light beam deflector elements, the at least one protection element is configured to be removably coupled to the portable measuring device.

15. A method comprising using the portable measuring device of claim 1 to contactlessly measure the diameter of the elongated object.

* * * * *